UNITED STATES PATENT OFFICE.

ALFRED HALL, OF PERTH AMBOY, NEW JERSEY.

IMPROVEMENT IN THE PROCESSES FOR COLORING BRICKS.

Specification forming part of Letters Patent No. 151,387, dated May 26, 1874; application filed August 13, 1873.

*To all whom it may concern:*

Be it known that I, ALFRED HALL, of Perth Amboy, in the county of Middlesex and State of New Jersey, have invented an Improved Colored Brick and process of making the same, of which the following is a specification:

This invention has for its object to surface-color building-bricks without glazing the same, and to enable their use as a dressing for building-fronts that are built up of ordinary red brick or other building material. My invention consists in the arrangement of coloring matter, in combination with building-brick, so that the coloring matter will not become glazed while being burned in.

For carrying out the invention the quality of the brick must, of course, be such as to stand the heat required to flux the mineral coloring matter without the use of a lead or other flux which will produce glazing. I therefore prefer to use bricks that are composed of about two-thirds of potter's or pipe clay and one-third sand. For coloring matter, I use cobalt for producing a blue or purple color; cobalt and manganese, in the proportions of one to eight, for neutral tint; iron stone for drab; oxide of copper, mixed with cobalt, for greenish tints, &c.; but I may, of course, for other tints and various shades, use other metallic coloring matter.

The color, preparatory to application, should be mixed with water containing a small proportion of slip that is made from any fire-proof or suitable clay, well washed, and is then applied to one or more sides or ends of the brick, after the same has been properly molded and shaped. The brick, thus colored, is then burned in the usual manner. In this way a useful and new article is produced.

I claim—

The process herein described of coloring brick, by applying color, in liquid form, to the surface of the brick subsequent to molding, and preparatory to burning the same, as specified.

ALFRED HALL.

Witnesses:
FRED. HAYNES.
MICHAEL RYAN.